Figure 2:
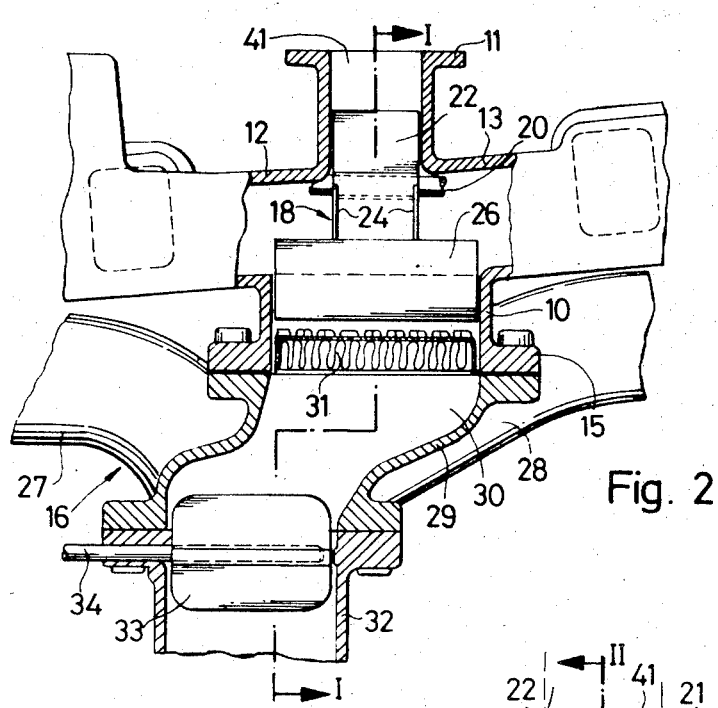

United States Patent
Heimburg

[11] 3,831,568
[45] Aug. 27, 1974

[54] INTERNAL COMBUSTION ENGINE FUEL-AIR MIXTURE PREHEATING APPARATUS

[75] Inventor: Fritz Heimburg, Russelsheim, Germany

[73] Assignee: General Motors Corporation, Detroit, Mich.

[22] Filed: Apr. 30, 1973

[21] Appl. No.: 355,692

[30] Foreign Application Priority Data
May 15, 1972   Germany............................ 2223655

[52] U.S. Cl. ........ 123/122 R, 123/52 MV, 123/141, 123/122 H
[51] Int. Cl. ............................................. F02m 31/00
[58] Field of Search... 123/122 AB, 122 AC, 122 H, 123/122 R, 141, 52 MV

[56] References Cited
UNITED STATES PATENTS
| | | | |
|---|---|---|---|
| 1,568,410 | 1/1926 | Minter | 123/141 |
| 2,597,977 | 5/1952 | Dahl | 123/122 H |
| 3,338,568 | 8/1967 | Mangoletsi | 123/122 AB |
| 3,456,634 | 7/1969 | Nelson | 123/122 AB |

*Primary Examiner*—Charles J. Myhre
*Assistant Examiner*—R. H. Lazarus
*Attorney, Agent, or Firm*—J. C. Evans

[57] ABSTRACT

A preheater for the fuel-air mixture of an internal combustion engine has a housing one end wall of which is closed by one side of a heat exchanger, an opposite end wall having an inlet, and a side wall having an outlet, for the mixture which can be selectively preheated by the operation of a pair of butterfly valves pivotally mounted between the inlet and the heat exchanger and to each side of the outlet, the vanes of the valve in one position (preheating) forming a guide baffle which directs the mixture into contact with the heat exchanger before reaching the outlet and in another position (no preheating) forming a trough shaped guide baffle by which the mixture is caused to flow directly from the inlet to the outlet of the housing.

6 Claims, 2 Drawing Figures

INTERNAL COMBUSTION ENGINE FUEL-AIR MIXTURE PREHEATING APPARATUS

This invention relates to apparatus for preheating the fuel-air mixture in a spark ignition internal combustion engine by means of the engine exhaust gases, and in particular to mixture preheating apparatus in motor road vehicle internal combustion engines in which a heat exchanger is provided between exhaust gas and fuel-air mixture conduits which are spacially separated from each other but in which the gaseous flow can be diverted by means of control valves.

It is known that by preheating the fuel-air mixture during cold starting of the vehicle the harmful exhaust gas constituents (mainly carbon monoxide and hydrocarbons) which are produced in particularly large quantities in such conditions can be substantially reduced. After the engine has warmed-up the preheating with the exhaust gases can be discontinued by appropriate positioning of the control valves and the diversion of the gas flows produced thereby.

In a known device of the aforesaid kind the upper part of the inlet openings of the intake of the induction pipe directed towards the incoming fuel-air mixture is covered by a control valve constructed as a guide channel. As a result, the mixture is compelled to flow through the heat exchanger (which is heated by the exhaust gases) before it can enter into the lower part of the inlet openings of the induction pipe. The disadvantage of this construction is the substantial narrowing of the inlet cross-section of the induction pipe during the preheating operation. Moreover, the fuel-air mixture is not prevented from partially escaping into the heat exchanger after the preheating has been cut off.

The present invention avoids these disadvantages by a construction in which, in a housing having an outlet leading into the engine intake passages a pivotal control valve, or a pair of control valves, are arranged so that, in a first extreme position the valves, without changing the inlet cross-section of the intake passages, form a baffle which prevents the gas-air mixture which enters the housing from passing to the intake passages before coming into contact with a heat exchanger, which is heated by exhaust gases, and in a second extreme position, again without changing the inlet cross-section of the intake passages, form a baffle which prevents the incoming gas-air mixture from passing into contact with the heat exchanger and diverts the mixture direct into said intake passages.

With an arrangement in accordance with the present invention a complete diversion of the mixture stream to the heat exchanger can be effected and, accordingly, an optimum preheating of the mixture. At the same time a full utilisation of the whole cross-section of all the intake pipes is assured, as is also the case when the preheating is discontinued. Moreover, an account of the baffle action of the valves, preheating of the air-fuel mixture in the intake pipes by the heat exchanger is prevented when switching over from the preheating operation.

The control valves are preferably arranged symmetrically in relation to the inlet openings of the intake pipe. Preferably, also, each control valve consists of a radially extending portion or vane and a portion bent over to form a vane at approximately right angles thereto the valves being arranged so that in the first extreme position (preheating) the radial vanes cover the openings to the intake pipes in the manner of a pitched roof. The control valve vanes which form the roof serve advantageously at the same time to form a baffle and to laterally divert the incoming fuel-air mixture.

Preferably, in the first extreme position (preheating) of the valves the bent over vane is made as a guide blade for guiding the fuel-air mixture to the heat - exchanger. This is conveniently effected if each said radial vane is connected by lateral arms with the respective angled vane, the space between the arms then forming a passage through which gases can flow when the parts are in the first extreme position (preheating).

In accordance with a further feature of the invention, when the preheating is switched off there is a complete separation of the fuel-air mixture from the preheating system through the fact that in the second extreme position the radial vanes form a guide trough for the incoming fuel-air mixture.

Figure 1:
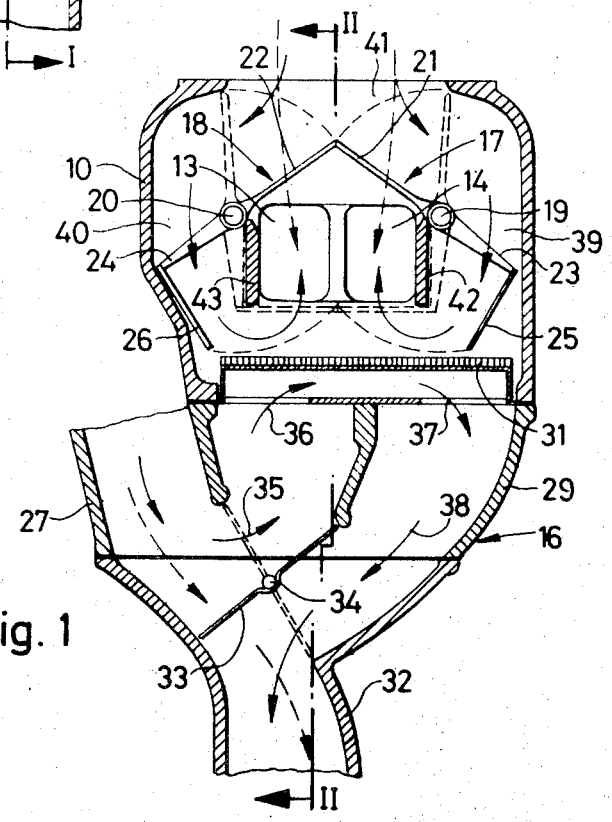

The scope of the invention is defined by the appended claims; and the invention and the method by which it is to be performed are hereinafter particularly described with reference to the accompanying drawings in which:

FIG. 1 is the vertical section through a preheating device according to the invention, on the line 1—1 of FIG. 2; and FIG. 2 is a vertical section on the line 2—2 of FIG. 1.

The fuel-air mixture preheater shown in the drawings comprises a housing 10 having at its upper end an inlet opening 41 surrounded by a flange 11 adapted to be secured to a carburetter (not shown) so that a fuel-air mixture from the carburetter is delivered into the housing 10 by way of the inlet opening 41.

At its lower end the housing 10 has an opening surrounded by a flange 15 by which the housing 10 is adapted to be secured on to an exhaust system 16 of an internal combustion engine (not shown), said lower end opening being closed by the corrugated wall of a heat exchanger unit 31 clamped between the housing 10 and exhaust system 16.

The exhaust system 16 includes curved branch pipes 27, 28 (FIG. 2) which open into a housing part 29 having at its upper end a flange by which it is secured to the flange 15 at the lower end of the housing 10. A passage 30 within the housing part 29 is divided by a partition 44 into two parts which respectively communicate with opposite end portions of the underside of the wall of the heat exchanger unit 31, the upper side of which is in communication with the housing 10.

An exhaust pipe 32 is secured to the lower end of the housing part 29 so as to receive the exhaust gases therefrom, and a butterfly valve 33 is mounted on a pivot pin 34 so that in a first position of the valve 33, shown in full lines in FIG. 1, the exhaust gases from the pipes 27, 28 are directed (as indicated by the arrows 35, 36, 37, 38) along the underside of the heat exchanger unit 31 before being discharged into the exhaust pipe 32. In a second position of valve 33, shown in dotted lines in FIG. 1, the exhaust gases pass directly from the pipes 27, 28 into the exhaust pipe 32.

Intermediate its upper and lower ends the housing 10 has in two opposite lateral walls thereof ports which lead into the engine combustion chamber inlet passages (of which only three passages 12, 13, 14 are shown in the drawings) by which a combustible fuel-air mixture is delivered to the combustion chambers and cylinders of the engine.

Extending between the said two opposite lateral walls of the housing 10 and forming lateral passages 39, 40 therewith are two partitions or ribs 42, 43 the depth of which is substantially that of the depth of the engine inlet passages 12, 13, 14 and which respectively extend from the sides of the said inlet passage ports which are respectively adjacent the other two opposite lateral walls of the housing 10, as shown in FIG. 1.

Adjacent the upper edges of the ribs 42, 43 and on the sides thereof nearer the adjacent wall of the housing 10, two control valves 17, 18 are respectively pivotally mounted by means of pivot pins 19, 20, the ribs 42, 43 and the valves 17, 18 being symmetrically disposed to each side of the centre line of the housing 10, as viewed in FIG. 1. The valves 17, 18 are each respectively formed with one valve flap on blade 21, 22 which extends radially from the pivot axis and a second, angled, flap or blade 25, 26 which extends at approximately 90° to the plane of the first blade 21, 22 and is retained spaced from but parallel to the pivot pin 19, 20 by pairs of arms 23, 24 which extend from the blades 21, 22 adjacent the opposite ends thereof. The arrangement and dimensions of the parts are such that, in a first extreme position of pivotal movement of the control valves 17, 18, shown in full lines in FIG. 1, the two blades 21, 22 meet at an angle so as to form a wedge or pitched roof shaped baffle which extends across the housing 10 between and above the level of the upper boundaries of the engine inlet passages 12, 13, 14. In such position the valve blades 21, 22 and the adjacent ribs 42, 43, as shown in FIG. 1, form a screen by which fuel-air mixture entering the inlet 41 of the housing 10 is divided by the wedge formed by the valve blades 21, 22 into two streams which are diverted so as to pass along the lateral passages 39, 40 between the ribs 42, 43 and the respective adjacent lateral walls of the housing 10 and then over the upper surface of the corrugated wall of the heat exchanger unit 31 before being able to leave the housing 10 by way of the engine inlet passages 12, 13, 14. In this position of the control valves 17, 18 gas flow through the passages 39, 40 is substantially unimpeded by the arms 23, 24; and the angled blades 25, 26 lie at an angle to the adjacent walls of the housing 10 and assist in diverting the fuel-air mixture across the heat exchanger 31.

In a second extreme position of movement of the control valves 17, 18 the radial blades 21, 22 extend substantially vertically, with the free edges of the blades engaging the upper walls of the housing 10 while the arms 23, 24 lie adjacent the outwardly facing sides of the ribs 42, 43 and the angled blades 25, 26 extend substantially horizontally from the lower edges of the ribs 42, 43 and meet each other at their free edges so as to form in this case a trough shaped baffle by which fuel-air mixture entering the inlet 41 is prevented from entering in to the lateral passages 39, 40 and from passing in contact with the heat exchanger 31 and is caused to flow direct to the engine inlet passages 12, 13, 14.

Operation of the control valves 17, 18, and the exhaust control valve 33 may be effected manually or automatically and with the control valves 17, 18 operated jointly with, or separately from, the exhaust control valve 33. Thus, the operation of the control valves 17, 18 could be effected automatically by a thermo-responsive actuator mechanism designed to move the control valves 17, 18 to the first extreme position (shown in full lines in FIG. 1) when the engine is cold and then to move the control valves to the second position (shown in dotted lines) when the engine has warmed-up, such control device also effecting the movement of the exhaust control valve 33 to the first position, shown in full lines in FIG. 1, so that exhaust gases are caused to pass in contact with the heat exchanger 31 on one side thereof and warm the incoming fuel-air mixture. Such actuator mechanisms are well known in the art and are therefore not described or shown herein.

When the engine has warmed-up, the control valves 17, 18 are moved to the second position (shown in dotted lines in FIG. 1) in which the fuel-air mixture is prevented from passing in contact with the heat exchanger. It will be noted that the angled blades 25, 26 of the control valves effectively screen the intake passage 41 from the heat exchanger 31 so that, even if the exhaust control valve 33 remains in its first position when the control valves 17, 18 are in their second position, the inlet passage will be substantially prevented from becoming heated by the heat exchanger 31.

It will be noted that in both positions of the control valves 17, 18 the full cross-sectional area of the engine inlet passages 12, 13, 14 is available for gas flow and that in both positions of the control valves the area of the flow path within the housing 10 is substantially equal to that of the inlet opening 41, thereby ensuring optimum flow conditions between the carburetter and engine inlet passages.

Although it is preferred to use two control valves 21, 22 symmetrically arranged to each side of the openings 13, 14, it will be understood that a single control valve could be similarly employed. Thus, if the wall shown in FIG. 1 between the openings 13, 14 were extended upwardly and downwardly to the level of the inlet 41 and heat exchanger unit 31 respectively, the radial vane of a single valve member (21 or 22) would in one position (preheating) engage such wall between the openings 13, 14, while in the other position the angled vane would engage such wall, the valve acting in each case as a guide baffle by which the fuel-air mixture is guided into contact with, or away from, the heat exchanger unit.

I claim:

1. A fuel-air preheater assembly for a spark ignition internal combustion engine, comprising a first and a second housing member with a heat exchanger unit secured therebetween with opposite sides of said heat exchanger unit respectively in communication with said first and second housing members through openings therein closed by said unit, said first housing member having side walls and having an end wall thereof opposite said unit with an inlet opening therein connectible to a carburetter to receive a fuel-air mixture therefrom and having in one of said side walls at least one opening forming an outlet in communication with passages connectible to the combustion chamber inlet passages of the engine, and said second housing member having therein inlet and outlet apertures respectively connectible to the engine to receive exhaust gas therefrom and to the engine exhaust system to deliver exhaust gas thereto; passage means in said second housing member to provide a flow path to direct exhaust gases from said inlet aperture into contact with one side of said heat exchanger unit before being delivered to said exhaust system; and a pair of butterfly valves which are respectively mounted to pivot about parallel axes which extend from points in said one side wall at each side of said outlet to the opposite side wall, each said valve having a first vane which extends substantially radially of its pivot axis and a second vane the free end portion of which extends substantially at right angles to the plane of the first vane, the arrangement and dimensions of said first housing member and valves being such that, in a first extreme position of pivotal movement of the valves the first vanes meet at an angle so as to form between the inlet opening and outlet of the first housing member a guide baffle by which fuel-air mixture entering the inlet of the first housing member is diverted between the surface of each valve directed away from said outlet and the respective adjacent side walls of said first housing member, and then over the adjacent surface of said heat exchanger unit before leaving said first housing member through said outlet, and in a second extreme position of pivotal movement of the valves the free edges of the first vanes engage the first housing member walls adjacent the inlet opening and said free end portions of said second vanes engage each other and form with said first vanes a trough shaped guide baffle interposed between the outlet and said heat exchanger unit so that fuel-air mixture entering said inlet opening is prevented from passing over said heat exchanger unit and passes direct to said outlet.

2. A fuel-air preheater assembly for a spark ignition internal combustion engine, comprising a first and a second housing member with a heat exchanger unit secured therebetween with opposite sides of said heat exchanger unit respectively in communication with said first and second housing members through openings therein closed by said unit, said first housing member having side walls and having an end wall thereof opposite said unit with an inlet opening therein connectible to a carburetter to receive a fuel-air mixture therefrom and having in one of said side walls at least one opening forming an outlet in communication with passages connectible to the combustion chamber inlet passages of the engine, and said second housing member having therein inlet and outlet apertures respectively connectible to the engine to receive exhaust gas therefrom and to the engine exhaust system to deliver exhaust gas thereto; passage means in said second housing member to provide a flow path to direct exhaust gases from said inlet aperture into contact with one side of said heat exchanger unit before being delivered to said exhaust system; a pair of partitions in said first housing member arranged respectively one to each side of said outlet and extending from the side wall containing said outlet to the opposite side wall; and a pair of butterfly valves respectively mounted on pivots adjacent the free edges of said partitions nearer said inlet opening, each one of said valves having a first valve vane extending radially from said pivot and a second vane secured to but separated by a space from said pivot and extending parallel thereto and substantially at right angles to said first vane; the arrangement and dimensions of said first housing member, partitions and valves being such that, in a first extreme position of pivotal movement of the valves the first vanes meet at an angle so as to form with said partitions a guide baffle by which fuel-air mixture entering the inlet of said first housing member is diverted to each side of said housing member between said partitions and the respective adjacent walls of the first housing member, and then over the surface of said heat exchanger before leaving said first housing member through said outlet, and in a second extreme position of pivotal movement of the valves the free edges of the first vanes lie adjacent the inlet opening and said second vanes engage each other and form with the first vanes and said partitions a trough shaped guide baffle interposed between the inlet and said heat exchanger unit so that fuel-air mixture entering said inlet opening is prevented from passing over said heat exchanger unit and passes direct to said outlet.

3. A fuel-air preheater assembly for a spark ignition internal combustion engine, comprising a first and a second housing member with a heat exchanger unit secured therebetween with opposite sides of said heat exchanger unit respectively in communication with said first and second housing members through openings therein closed by said unit, said first housing member having side walls and having an end wall thereof opposite said unit with an inlet opening therein connectible to a carburetter to receive a fuel-air mixture therefrom and having in a side wall at least one opening forming an outlet in communication with passages connectible to the combustion chamber inlet passages of the engine, and said second housing member having therein inlet and outlet apertures respectively connectible to the engine to receive exhaust gas therefrom and to the engine exhaust system to deliver exhaust gas thereto; passage means in said second housing member to provide a flow path to direct exhaust gases from said inlet aperture into contact with one side of said heat exchanger unit before being delivered to said exhaust system; and a butterfly valve mounted to pivot about an axis which extends between opposite side walls of said first housing portion, said valve having a first vane which extends substantially radially of its pivot axis and a second vane the free end portion of which extends substantially at right angles to the plane of the first vane, the arrangement and dimensions of said first housing member and valve being such that, in a first extreme position of pivotal movement of the valve the free end of said first vane engages a side wall and the first and second vanes form between the inlet opening and outlet of the first housing member, a guide baffle by which fuel-air mixture entering said inlet opening is diverted between the surface of the valve remote from said outlet and the side wall of said first housing member opposed to said surface, and then over the adjacent surface of said heat exchanger unit before leaving said first housing member through said outlet, and in a second extreme position of pivotal movement of the valve the free end of the first vane engages said opposed side wall adjacent the inlet opening and the free end portion of said second vane engages the side wall previously engaged by said first vane so that said valve forms a trough shaped guide baffle interposed between the outlet and said heat exchanger unit so that fuel-air mixture entering said inlet opening is prevented from passing over said heat exchanger unit and passes direct to said outlet.

4. A fuel-air preheater assembly according to claim 2, in which said control valves are arranged symmetrically with respect to said outlet.

5. A fuel-air preheater assembly according to claim 2, in which the second vane of said valve member is connected to said pivot by arms through which said fuel-air mixture flows when said valve is in its first said extreme position.

6. A fuel-air preheater assembly according to claim 5, in which said second vane is arranged so as to direct said fuel-air mixture towards said heat exchanger unit when said valve is in its first said extreme position.

* * * * *